UNITED STATES PATENT OFFICE.

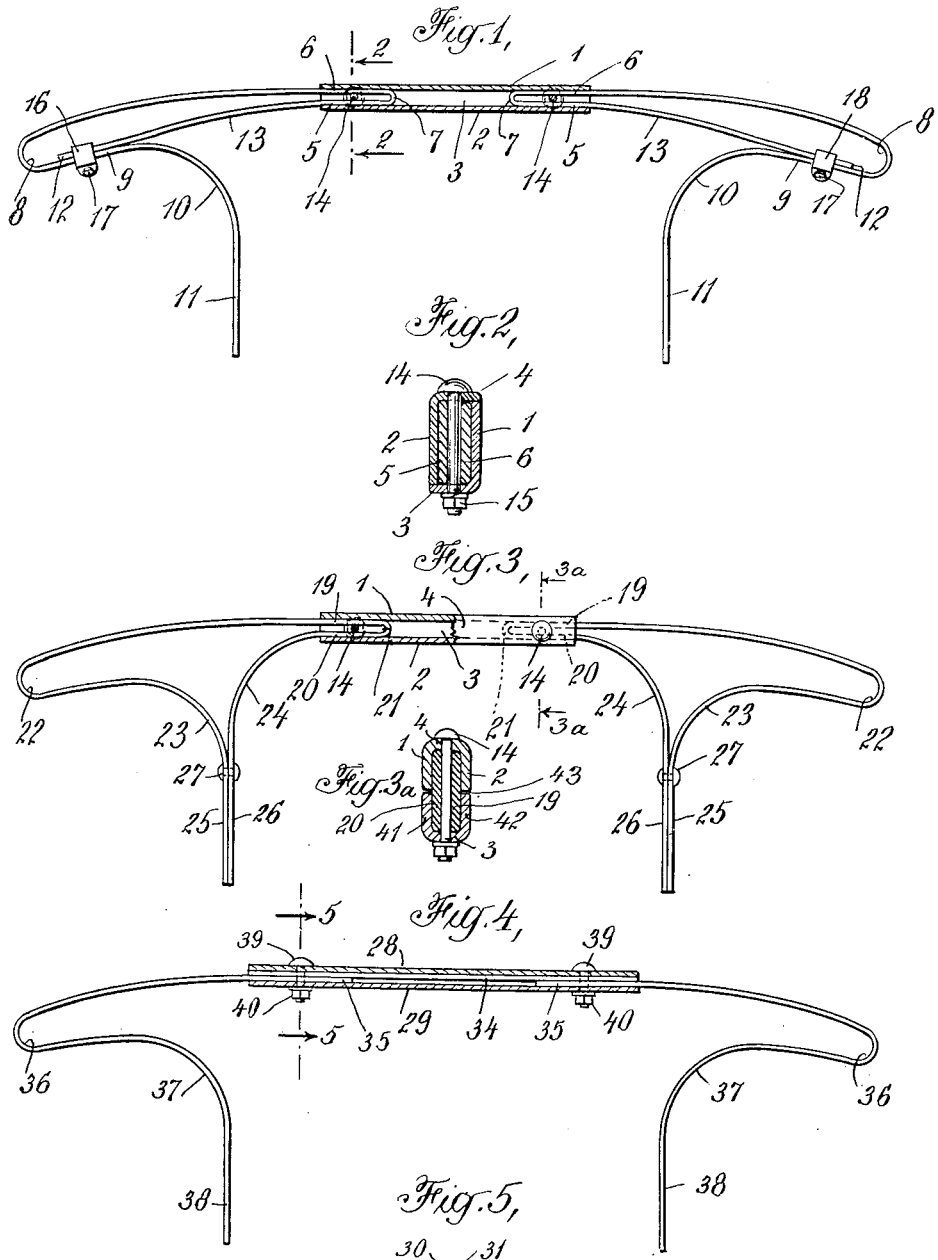

GEORGE ALBERT LYON, OF PHILADELPHIA, PENNSYLVANIA.

RESILIENT AUTOMOBILE-BUFFER.

1,386,186. Specification of Letters Patent. Patented Aug. 2, 1921.

Application filed February 10, 1920. Serial No. 357,757.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Resilient Automobile-Buffers, of which the following is a specification, taken in connection with the accompanying drawing.

This invention relates especially to resilient buffers adapted for use on automobiles or other vehicles and which may comprise end loop attaching members formed of spring strip and preferably having duplex or looped connector portions extending inward toward the center of the buffer front. These connector portions may be adjustably or otherwise connected together by coöperating connector members of any suitable character, comprising if desired, one or more reinforcing strips or members, duplex alining or channel connector members being advantageous for this purpose and more or less inclosing or clamping around the connector portions of the end loop attaching members so as to rigidly support them in adjusted position. Such connector members may comprise two generally similar channel members adapted to inclose and more or less aline the connector portions and be clamped or secured thereto as by connector bolts passing through or around these connector members.

In the accompanying drawing showing in a somewhat diagrammatic way illustrative embodiments of this invention, Figure 1 is a plan view partly in section showing illustrative form of buffer.

Fig. 2 is an enlarged transverse sectional view taken along the line 2—2 of Fig. 1.

Fig. 3 is a plan view of another buffer partly in section.

Fig. 3ª is an enlarged transverse section thereof taken along the line 3ª of Fig. 3.

Fig. 4 is a plan view of another construction, and

Fig. 5 is an enlarged transverse section along the line 5—5 of Fig. 4.

Although not in all cases necessary the buffer may advantageously comprise two generally similar end loop attaching members each formed of one or more strips of spring steel or other resilient material. As indicated in Fig. 1 each of these members may in some cases be formed of a single strip of spring steel a quarter of an inch or so thick and two inches or so wide in a vertical direction, each member comprising an attaching member or portion 11 having the outwardly curved yielding portion 10, which at about the point 9 may extend substantially parallel to the adjacent front strip or portion of the member. Each member may comprise an end loop 8 if desired and an inwardly extending duplex connector portion 5, 6 preferably comprising the connector loop 7. If desired, also the inner connector portion 13 may extend outward and have a stiffening end 12 clamped or bolted to the coöperating part of the member 9 as by the inclosing clamp or clip 18 holding both of these strips closely and rigidly together when the bolt or nut 17 is tightened. A single spring steel strip of such general character may be bent up in this shape preferably first forming the connector loop 7 of such width as to accommodate the connector bolts to be used and then thereafter the end loop 8 and other portions by means of suitable forms and bending devices, so that after hardening and tempering the one piece end loop attaching member may be finished, polished and lacquered for assembly or sale. Two such resilient members may be adjustably and securely connected by any suitable coöperating connector members preferably of a duplex alining character which may comprise one or more channel alining connectors if desired. Fig. 2 shows one type of such members comprising the two angular sections 1, 3 and 2, 4 of such shape and size as to closely inclose the connector portions and hold them together by means of two or more connector bolts 14 extending through slots or holes in the connector members and through the relatively tight fitting or narrow openings between the connector portions of the attaching members. Screwing up these bolts rigidly connects the coöperating connector portions and also holds them in vertical alinement so that rattling and shaking is prevented under running conditions of the vehicle while under collision conditions the connector portions amply project into the connector members at the central part of the buffer so that any collision strains are carried outward and transmitted through the outwardly extending resilient strip members. This form of buffer also forms a convenient and relatively small package for shipment and sale and may, as indicated, be readily adjusted to vary the width of the attaching members 11 so that it may be secured or connected to automobiles in which the frame members are at different distances apart.

Fig. 3 shows another arrangement in which the one piece end loop attaching members may have duplex attaching ends or portions 25, 26 which may, if desired, be permanently connected as by welding or riveting, the rivet 27 being shown for this purpose. Each generally similar member of spring steel or other resilient strip may have the outwardly extending curved portion 23 and end loop 22, while the member may have duplex connector portions 19—20 terminating in the narrow connector loop 21 if desired. The inner attaching end 26 may be brought up in the form of a curved portion 24 to give additional yielding strength to this part of the buffer. Any suitable form of more or less resilient and strong connector devices may be used to connect preferably in an adjustable way these coöperating connector portions and for this purpose such duplex channel connector members as shown in Fig. 3ª may be used in this case or to connect the preceding type of buffer shown in Fig. 1 The connector member 4 may have the alining flanges 1, 2, while the lower member 3 has similar flanges 41, 42 of such size and shape as to fit down around the connector portions of the two buffer members and hold them in alinement and connect them in a vertically rigid manner, when these connector members are clamped or forced together as by the bolts 14. Any desired number of such bolts may be used and may be tightened by the nuts and lock washers shown to securely connect the buffer members, preferably after each has been loosely secured or clamped to the automobile frame member.

Fig. 4 shows still another arrangement in which a different form of duplex channel connector member is used to connect and aline the coöperating buffer members. These buffer members may comprise the inwardly extending connector portions 35, formed, if desired, with integral end loops 36 and curved yielding portions 37 connected to the attaching members 38. One or more front reinforcing strips or members may be used in overlapping engagement with the strip ends 35 if desired, and all of these front strips or members may be alined and connected by suitable duplex channel connector members of the type shown in Fig. 5 in which the channel connector member 28 may be formed with the curved alining flanges 30, 32, while the coöperating channel connector 29 has the generally similar flanges 31, 33. These coöperating connector members may be clamped around the buffer strips or members by two or more bolts 39 which may advantageously have rounded ornamental heads in front of the buffer while the nuts and lock washers 40 extend to the rear of this front portion. By forming suitable slots or series of adjusting holes in some of the members such as the connector strip ends 35, lateral adjustment may be secured in this type of construction.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims:

1. The automobile buffer comprising two generally similar one piece end loop attaching members formed of resilient spring steel strip and each comprising inwardly extending duplex connector portions having a narrow connector loop and a rear connector portion having a stiffening end clamped to the rear portion of the end loop and coöperating duplex alining connector members comprising two similar channel connectors to fit vertically over the duplex connector portions of said attaching members adjacent the connector loops thereof and clamping bolts passing through said connector members and connector portions adjacent said connector loops to adjustably secure said connector portions in vertically rigid position.

2. The automobile buffer comprising two end loop attaching members formed of resilient strip and each comprising inwardly extending duplex connector portions having a narrow connector loop and coöperating duplex alining connector members comprising two similar channel connectors to fit vertically over the duplex connector portions of said attaching members adjacent the connector loops thereof and clamping bolts passing through said connector members and connector portions adjacent said connector loops to adjustably secure said connector portions in vertically rigid position.

3. The automobile buffer comprising two end loop attaching members formed of resilient strip and each comprising inwardly extending duplex connector portions having a narrow connector loop and coöperating duplex alining connector members comprising connectors to engage the duplex connector portions of said attaching members adjacent the connector loops thereof and coöperating clamping means to adjustably secure said connector portions in vertically rigid position.

4. The automobile buffer comprising two generally similar one piece end loop attaching members formed of resilient strip and each comprising inwardly extending duplex looped end connector portions adapted to be releasably connected and a rear connector portion having a stiffening end clamped to the rear portion of the end loop and coöperating alining connector members to adjustably secure said connector portions in vertically rigid position.

5. The automobile buffer comprising two generally similar end loop attaching members formed of resilient strip and each comprising inwardly extending duplex looped end connector portions adapted to be releasably connected and a rear connector portion having a stiffening end clamped to the rear portion of the member.

6. The automobile buffer comprising two generally similar end loop attaching members formed of resilient strip and each comprising inwardly extending horizontally overlapping duplex connector portions adapted to be releasably connected.

7. The automobile buffer comprising generally similar one piece end loop attaching members formed of vertically arranged resilient spring steel strip and each comprising an end loop adapted to project into protective position adjacent the vehicle wheel and inwardly extending narrow duplex connector portions having a narrow connector loop and adapted to be adjustably secured in vertically rigid position.

8. The automobile buffer comprising end loop attaching members formed of vertically arranged resilient spring steel strip and each comprising an end loop adapted to project into protective position adjacent the vehicle wheel and inwardly extending narrow duplex connector portions, each having horizontally overlapping portions of said strip.

9. The automobile buffer comprising attaching members formed of vertically arranged resilient spring steel strip and each comprising an inwardly extending narrow duplex connector portion having horizontally overlapping portions.

10. The automobile buffer comprising attaching members each comprising an inwardly extending narrow duplex connector portion formed of vertically arranged resilient strip and having a narrow connector loop and coöperating duplex alining connector members comprising two similar channel connectors to fit vertically over the duplex connector portions of said attaching members and clamping bolts passing through said connector members and connector portions adjacent said connector loops to adjustably secure said connector portions in vertically rigid position.

11. The automobile buffer comprising attaching members each comprising an inwardly extending narrow duplex connector portion formed of vertically arranged resilient strip and coöperating alining connector members comprising a channel connector to fit vertically over the duplex connector portions of said attaching members and clamping bolts passing through said connector members and connector portions adjacent said connector loops to adjustably secure said connector portions in vertically rigid position.

12. The automobile buffer comprising attaching members each comprising an inwardly extending narrow duplex connector portion formed of vertically arranged resilient strip and coöperating alining connector members comprising a channel connector to fit vertically over the duplex connector portions of said attaching members and clamping means to secure said connector portions in vertically rigid position.

13. The automobile buffer comprising inwardly extending narrow vertically arranged duplex connector portions and coöperating alining connector members comprising channel connectors to fit vertically over said connector portions and clamping devices engaging said connector members to adjustably secure said connector portions in vertically rigid position.

14. The automobile buffer comprising inwardly extending narrow vertically arranged connector portions and coöperating alining connector members comprising channel connectors to fit over said connector portions and clamping devices engaging said connector members to adjustably secure said connector portions in vertically rigid position.

GEORGE ALBERT LYON.